(12) United States Patent
Jones (10) Patent No.: US 9,100,705 B2
(45) Date of Patent: Aug. 4, 2015

(54) METHODS AND APPARATUS FOR INDEXING AND/OR ADVERTISING IN A USER SELECTED DOWNLOADED DIGITAL VIDEO RECORDING

(71) Applicant: David Allan Jones, Salt Lake City, UT (US)

(72) Inventor: David Allan Jones, Salt Lake City, UT (US)

( * ) Notice: Subject to any disclaimer, the term of this patent is extended or adjusted under 35 U.S.C. 154(b) by 0 days.

(21) Appl. No.: 14/327,532

(22) Filed: Jul. 9, 2014

(65) Prior Publication Data

US 2014/0325564 A1 Oct. 30, 2014

(51) Int. Cl.
| | |
|---|---|
| H04N 7/173 | (2011.01) |
| H04N 21/472 | (2011.01) |
| H04N 21/81 | (2011.01) |
| H04N 21/274 | (2011.01) |

(52) U.S. Cl.
CPC ....... *H04N 21/47217* (2013.01); *H04N 21/274* (2013.01); *H04N 21/812* (2013.01)

(58) Field of Classification Search
CPC .................. H04N 21/47202; H04N 21/47217
USPC ............. 725/133, 134, 39, 86, 42, 50, 51, 52, 725/131, 92, 100, 115
See application file for complete search history.

(56) References Cited

U.S. PATENT DOCUMENTS

| | | | |
|---|---|---|---|
| 6,850,252 B1 * | 2/2005 | Hoffberg ...................... 715/716 |
| 7,197,758 B1 * | 3/2007 | Blackketter et al. ............ 725/37 |
| 7,813,822 B1 * | 10/2010 | Hoffberg ........................ 700/94 |
| 7,974,714 B2 * | 7/2011 | Hoffberg ........................ 700/94 |
| 2002/0166123 A1 * | 11/2002 | Schrader et al. ................ 725/58 |
| 2003/0093790 A1 * | 5/2003 | Logan et al. .................... 725/38 |
| 2005/0060229 A1 * | 3/2005 | Riedl et al. ..................... 705/14 |
| 2005/0220439 A1 * | 10/2005 | Carton et al. ..................... 386/4 |
| 2007/0016476 A1 * | 1/2007 | Hoffberg et al. ................ 705/14 |
| 2008/0092168 A1 * | 4/2008 | Logan et al. .................... 725/44 |
| 2008/0155581 A1 * | 6/2008 | Leary ............................. 725/13 |
| 2009/0254931 A1 * | 10/2009 | Pizzurro et al. ................... 725/5 |
| 2010/0122282 A1 * | 5/2010 | Dubose ........................... 725/32 |
| 2012/0095958 A1 * | 4/2012 | Pereira et al. ................. 707/609 |
| 2013/0111519 A1 * | 5/2013 | Rice et al. ....................... 725/34 |
| 2013/0160047 A1 * | 6/2013 | DuBose .......................... 725/32 |
| 2013/0332954 A1 * | 12/2013 | Pizzurro et al. ................ 725/34 |
| 2015/0052552 A1 * | 2/2015 | Pizzurro et al. ................ 725/34 |
| 2015/0058883 A1 * | 2/2015 | Tidwell et al. ................. 725/34 |

* cited by examiner

*Primary Examiner* — Nathan Flynn
*Assistant Examiner* — Caroline Somera (57) ABSTRACT

A method and apparatus of indexing a previously digitally recorded program of an audio and video program comprising: first, downloading the digital recording of the audio and video program; second, downloading from a server an index of the digital audio and video program to be associated with the digital recording of the audio and video program so as to navigate the digital recording of the audio and video program; third associating the index to the digital audio and video recording enabling a user of the digitally recorded audio and video program to navigate the digital recording of the audio and video program according to the index; and fourth, enabling the user to navigate the indexed associated digital recording of the audio/video program using the index applied to the digital recording of the audio and video program among many other aspects not allowed regarding the length of this abstract.

19 Claims, 3 Drawing Sheets

METHODS AND APPARATUS FOR INDEXING AND/OR ADVERTISING IN A USER SELECTED DOWNLOADED DIGITAL VIDEO RECORDING

CROSS-REFERENCE TO RELATED APPLICATIONS

Background of the Invention

1. The Field of the Invention

A digital video recorder (DVR), sometimes referred to by the merchandising term personal video recorder (PVR), is a consumer electronics device or application software that records video in a digital format to a disk drive, USB flash drive, SD memory card, SSD or other local or networked mass storage device. The term includes set-top boxes (STB) with direct to disk recording facility, portable media players (PMP) with recording, recorders (PMR) as camcorders that record onto Secure Digital memory cards and software for personal computers which enables video capture and playback to and from a hard disk drive. A television set with built-in digital video-recording facilities was introduced by LG in 2007, followed by other manufacturers.

Consumer digital video recorders ReplayTV and TiVo were launched at the 1999 Consumer Electronics Show in Las Vegas, USA. Microsoft also demonstrated a unit with DVR capability, but this did not become available until the end of 1999 for full DVR features in Dish Network's DISHplayer receivers. TiVo shipped their first units on Mar. 31, 1999. ReplayTV won the "Best of Show" award in the video category with Netscape co-founder Marc Andreessen as an early investor and board member, but TiVo was more successful commercially. While early legal action by media companies forced ReplayTV to remove many features such as automatic commercial skip and the sharing of recordings over the Internet, newer devices have steadily regained these functions while adding complementary abilities, such as recording onto DVDs and programming and remote control facilities using PDAs, networked PCs, and Web browsers.

Hard-disk based digital video recorders make the "time shifting" feature (traditionally done by a VCR) much more convenient, and also allow for "trick modes" such as pausing live TV, instant replay of interesting scenes, chasing playback where a recording can be viewed before it has been completed, and skipping of advertising. Most DVRs use the MPEG format for compressing the digitized video signals. Video recording capabilities have become an essential part of the modern set-top box, as TV viewers have wanted to take control of their viewing experiences. As consumers have been able to converge increasing amounts of video content on their set-tops, delivered by traditional 'broadcast' cable, satellite and terrestrial as well as IP networks, the ability to capture programming and view it whenever they want has become a must-have function for many consumers.

At the 1999 CES, Dish Network demonstrated the hardware that would later have DVR capability with the assistance of Microsoft software which also included WebTV Networks internet TV. By the end of 1999 the Dishplayer had full DVR capabilities and within a year, over 200,000 units were sold.

In the UK, digital video recorders are often referred to as "plus boxes" (such as BSKYB's Sky+ and Virgin Media's V+ which integrates an HD capability, and the subscription free Freesat+ and Freeview+). Freeview PVR have been around in the UK since the late 2010s British Sky Broadcasting markets a popular combined EPG and DVR as Sky+. TiVo launched a UK model in 2000, and while no longer on sale, the subscription service is still maintained. South African based Africa Satellite TV beamer Multichoice recently launched their DVR which is available on their DStv platform. In addition to ReplayTV and TiVo, there are a number of other suppliers of digital terrestrial (DTT) DVRs, including Thomson, Topfield, Fusion, Pace Micro Technology, Humax, AC Ryan Playon and Advanced Digital Broadcast (ADB).

Many satellite, cable and IPTV companies are incorporating digital video recording functions into their set-top box, such as with DirecTiVo, DISHPlayer/DishDVR, Scientific Atlanta Explorer 8xxx from Time Warner, Total Home DVR from AT&T U-verse, Motorola DCT6412 from Comcast and others, Moxi Media Center by Digeo (available through Charter, Adelphia, Sunflower, Bend Broadband, and soon Comcast and other cable companies), or Sky+. Astro introduced their DVR system, called Astro MAX, which was the first PVR in Malaysia but was phased out two years after its introduction.

In the case of digital television, there is no encoding necessary in the DVR since the signal is already a digitally encoded MPEG stream. The digital video recorder simply stores the digital stream directly to disk.

In 2003 many Satellite and Cable providers introduced dual-tuner digital video recorders. In the UK, BSkyB introduced their first PVR Sky+ with dual tuner support in 2001. These machines have two independent tuners within the same receiver. The main use for this feature is the capability to record a live program while watching another live program simultaneously or to record two programs at the same time, possibly while watching a previously recorded one. Kogan Technologies introduced a dual-tuner PVR in the Australian market allowing free-to-air television to be recorded on a removable hard drive. Some dual-tuner DVRs also have the ability to output to two separate television sets at the same time. The PVR manufactured by UEC (Durban, South Africa) and used by Multichoice and Scientific Atlanta 8300DVB PVR have the ability to view two programs while recording a third using a triple tuner.

Where several digital subchannels are transmitted on a single RF channel, some PVRs can record two channels and view a third, so long as all three subchannels are on two channels (or one).

In the United States, DVRs were used by 32 percent of all TV households in 2009, and 38 percent by 2010, with viewership among 18- to 40-year-olds 40 percent higher in homes that have them.

Digital video recorders are often integrated in the LCD and LED TV-sets. These systems let the user simplify the wiring and installation, because they do not use ports (SCART or HDMI), and they only need to use only one device and power and the same remote control instead of two.

There are examples of security systems integrated into such DVRs, and thus they are capable of recording more input streams in parallel. Some of them include wireless ports such as (Bluetooth and Wi-Fi), so they can play and record files to or from cellular phones and other devices. Such devices can also be used as disguised observation systems, displaying pictures or videos as typical store display.

Software and hardware is available which can turn personal computers running Microsoft Windows, Linux, and Mac OS X into DVRs, and is a popular option for home-theater PC (HTPC) enthusiasts.

Standalone over-the-air (OTA) digital video recorders are hardware-based set-top-boxes that use an HDTV antenna to record over-the-air broadcast television signals. Several companies have launched over-the-air DVR products for the consumer market over the past few years.

For example, Elgato makes a series of digital video recording devices called EyeTV. The software supplied with each device is also called EyeTV, and is available separately for use on compatible third-party tuners from manufacturers such as Pinnacle, TerraTec, and Hauppauge.

SageTV provided DVR software for the Mac but no longer sells it. Previously sold devices support the Hauppauge HVR-950, myTV.PVR and HDHomeRun hardware with its DVR software. SageTV software also included the ability to watch YouTube and other online video with a remote control.

MythTV (see above) also runs under Mac OS X, but most recording devices are currently only supported under Linux. Precompiled binaries are available for the MythTV front-end, allowing a Mac to watch video from (and control) a MythTV server running under Linux.

Apple provides applications in the FireWire software developer kit which allow any Mac with a FireWire port to record the MPEG2 transport stream from a FireWire equipped cable box (for example: Motorola DCT62xx, including HD streams). Applications can also change channels on the cable box via the firewire interface. Only broadcast channels can be recorded as the rest of the channels are encrypted. FireRecord (formerly iRecord) is a free scheduled-recording program derived from this SDK.

There are several free digital video recording applications available for Microsoft Windows including GB-PVR, MediaPortal, and Orb (web-based remote interface).

There are also several commercial applications available including CyberLink, SageTV (which is no longer available after Google acquired it in June 2011), Beyond TV (which is considered discontinued despite an official announcement from SnapStream since the last update was October 2010 and they are concentrating on their enterprise search products), DVBViewer, Showshifter, InterVideo WinDVR, the R5000-HD and Meedio (now a dead product—Yahoo! bought most of the company's technology and discontinued the Meedio line, and rebranded the software Yahoo! Go—TV, which is now a free product but only works in the U.S). Most TV tuner cards come bundled with software which allows the PC to record television to hard disk. See TV tuner card. For example, Leadtek's WinFast DTV1000 digital TV card comes bundled with the WinFast PVR2 software, which can also record analog video from the card's composite video input socket.

Windows Media Center is a DVR software by Microsoft which was bundled with the Media Center edition of Windows XP, the Home Premium/Ultimate editions of Windows Vista, as well as most editions of Windows 7. When Windows 8 was released in 2012, Windows Media Center was not included with Windows 8 OEM or Retail installations, and was only available as a $15 add-on pack (including DVD Playback codecs) to Windows 8 Pro users.

Television and video are terms that are sometimes used interchangeably, but differ in their technical meaning. Video is the visual portion of television, whereas television is the combination of video and audio modulated onto a carrier frequency (i.e., a television channel) for delivery. Most DVRs can record both.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Several embodiments include a method of indexing a previously digitally recorded program of an audio and video program and can comprise:

first, downloading the digital recording of the audio and video program;

second, and later, downloading from a server an index of the digital audio and video program to be associated with the digital recording of the audio and video program so as to facilitate navigation of the digital recording of the audio and video program, the second, and later downloading from the server of the index can occur between 1 minute and 1 week later, about 5 minutes, about 30 minutes, about one hour, about one day, or about one week later.

third associating the index to the digital audio and video recording enabling a user of the digitally recorded audio and video program to navigate the digital recording of the audio and video program according to the index;

fourth, enabling the user to navigate the indexed associated digital recording of the audio/video program using the index applied to the digital recording of the audio and video program.

The indexing may not be previously predictable prior to recording of the audio and video program as the indexed events or programs may not be previously determined.

The audio and video program can be a sports event and the indexing can be directed to a division of the sports event determined or including by the beginning and/or end of a quarter, period, bout, or half-time event of the sports event.

The audio and video program can be a reality show where a certain chapter or segment of the program extends in length longer or shorter than another chapter or segment of the program. In these embodiments the duration of the certain chapter or segment of the reality show might not be previously known.

The audio and video program can be a news program where a certain chapter or segment of the news program extends in length longer or shorter than another chapter or segment. In these embodiments the duration of the certain chapter or segment of the news program might not be previously known.

The downloading of an audio visual advertising segment can be inserted or supplement the recording while the user navigates from a first indexed segment to a second indexed segment.

The audio and video program can be audio and visually adjusted according to the index.

The indexing of the audio and video program can be manually selectable by the user.

The indexing of the audio and video program can be viewable and manually approved by the user prior to its application to the program.

The indexing of the audio and video program can be automatically or manually determined based on a personal attribute of the user.

The indexing of the audio and video program can be determined and selected based on the age of the user.

The indexing of the audio and video program can be determined based on a special need of the user such as a medical need or specific interest thereof.

The audio visual advertisement can be presented in a sub-window as the user navigates from the first indexed segment to the second indexed segment.

The audio visual advertisement can be presented in a manner that is entirely secondary to the display of the original audio visual program as the user navigates from the first indexed segment to the second indexed segment.

The audio visual advertisement can be presented to the user via an email, messaging, or text media.

The audio visual advertisement can be presented in a manner that is entirely secondary to the display of the original audio visual program as the user navigates from the first indexed segment to the second indexed segment.

The audio visual advertisement can be presented in a social media once agreed upon by the user.

The audio visual advertisement can be presented in a manner that does not disturb the time-shifting aspect of the forwarding navigation from the first indexed segment to the second indexed segment.

The audio visual advertisement can be subsequently updated based on a georeferenced location of the user.

The subsequent updating of the audio visual advertisement based on the georeferenced location of the user can be conducted between 1 minute and 1 week later, about 5 minutes, about 30 minutes, about one hour, about one day, or about one week later, one month later, or more depending on the circumstances.

The audio visual advertisement can be subsequently updated based on a fight ticket aspect based on bouts or divisions of the fight.

An apparatus or computer readable medium can be configured to perform the aspects discussed herein.

A server can also be configured to provide the data to the DVR as discussed herein.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Referring to U.S. Publication 2014/0104495, the contents of which are hereby incorporated by reference in their entirety as showing components of a conventional DVR that can perform and be configured to perform the inventions herein as discussed below.

DETAILED DESCRIPTION OF THE PREFERRED EMBODIMENTS

One aspect of a DVR and DVR server that this patent application addresses is that content is generally recorded before being viewed. And, when viewed, the content is not indexed, such as in a movie DVD or other aspect where you can navigate from section to section. For example in a sports game recording it would be impossible to index the sports game prior to its recording as it is impossible to predict when a first period, quarter, or other variable portion were to begin and end; and, it is impossible to selectively navigate around advertising, commentary, pre-shows, post-shows, etc. there between, for example. Moreover, in many TV shows the beginning and ending of a chapter or segment is not always predictable. For example, in Shark Tank there may be one episode portion of a first proposed product proposed that is longer than a second episode portion of a second proposed product proposed. And, currently these DVR recorded shows are not accurately indexed such that a user can manually skip through the recording and other media previously discussed as well as introductions to the cast to reach the next chapter, section, period, or quarter. As such, an ample amount of user time is used to scan, or time shift, to another desired location instead of skip, be provided with an understandable index or otherwise understand the program's content.

Moreover, there might be a news program that is not properly indexed. For example, 60 Minutes, Frontline, Nova, Nightline, Local News, or 20/20 may not have an indexed navigatable criteria to manually, or automatically, navigate the program after the program is recorded. According to some embodiments disclosed herein a news program can also be indexed. Importantly to some embodiments, the indexing of such program is different from post-recording a live program as most news programs are at least partially prerecorded making indexing possible. However, pre-indexing a lived recorded program on a DVR is clearly difficult, if not impossible, depending on the timeframe.

Thus, a user can benefit from a post-provided adjusted, or indexed, digital audio and video program recorded on a DVR. In addition, a provider of that program can benefit from an increased viewing of that adjusted, or index enabled, navigable program on a subscriber's DVR, such as a TIVO box or other DVR device. For example, a program might have multiple sections of a sports event, chapters of a story, sections of a movie, or sections of a reality show, such as Shark Tank or other reality show, for example. And, a subscriber might enjoy having those sections of a digitally recorded (DVR'd) recording indexed and navegatable. Such subscriber might also be charged an additional subscription for such service. That is, they can be charged, or receive advertisement, to skip to the desired location within the DVR'd recording as opposed to scanning through the program. Moreover, an index map, or guide, can be visually provided to the user to inform them of the customized indexing and content locations of the media previously recorded or presented. As such, the user not only receives a recording of the DVR'd media, but also a visual index or content map thereof. And, as discussed, the mapping and indexing can be customized particularly to the personal user in some embodiments based on preferences, previous usage, age, gender, interests, and historical background of program interest.

In addition, the provider of that program, or a person associated thereto, can insert advertisement(s) into the program at the indexed location(s) to further interest the user or provide profitable media therein. In further addition, a selectable or preferred version of the media may be provided by such indexing in a DVR recording such as for children, elderly, certain interest, or special needs users. In further addition, technological means may be used to provide the advertisement without disrupting the viewing of the media such as a second screen to simultaneously display the advertisement media, redirecting media to an email or text associated with the user.

The advertisement, or supplemental media generated, can also be provided in a small window so as not to constitute a derivative work for purposes of copyright infringement possible concerns. For example, as the user time-shifts by fast forwarding, the user can be provided with real-time entertainment advertising in a reduced, tangential, or alternative means so as to leave the original media in-place as far as a DVR is concerned.

Moreover, the inserted advertisement media can be updated in the DVR post-recording. For example, an advertisement between index A inserted between period 1 and period 2 of a hockey game can be modified in a DVR recording from MCDONALDS to IN AND OUT BURGER either in the same or a subsequent game. In addition, the advertisement in a DVR recording in a geographic, or specific location can be changed likewise. For example, FIVE GUYS restaurant might be well received in one location such as Washington, D.C., (Location A) but not another such as in Salt Lake City, Utah (Location B). As a result, a FIVE GUYS advertisement can be inserted at an indexed location 1 for residents of Washington D.C. (Location A) and a BURGER KING advertisement can be inserted into the DVR recording at index 2 (Location B) for another location.

Thus, for this example, there can be one or more of: (1) an index insertion into a DVR recording. There can also be (2) advertising provided at that indexed DVR recording. There can also be (3) georeferenced, age, preference, selective, selection of advertising provided at that indexed location. There can also be (4) user selection criteria of advertising provided at that indexed location. Importantly, the base for such options is centered on an inserted index to a DVR'd program outside of the original program itself. And, the program is not a hard source such as a DVD or such as the product sold by Cleanflicks. Rather, it exists generally in software, content downloaded and updated, or a copy downloaded via a DVR including metadata, internal tags, a time indexed adjacent media that supplements the program, or other indicators therein, or an external indicator map downloaded and downloaded therein when requested by the map therein.

The index insertion can be manually, or automatically inserted. For example, for parental controls, preferred controls, preferential controls, or elderly controls, an index can be inserted manually by a publisher. Moreover, auto recognition can be used or a studio might issue insertion of an index for excluding a portion of media recorded by a DVR or based on a preference of the particular viewer.

Moreover, modification of the DVR recording may be subsequently made by the distributor. For example, if certain content of the recording is determined to be inappropriate the distributor can replace that portion using an index or map thereof. And, if a certain portion is deemed to violate a law such as copyright or privacy laws such modification can be automatically made after the recording is distributed and recorded.

As further addition, the advertisement(s) can be selectable in the DVR'd media to allow the user to automatically receive online advertisement incentive or to further investigate or purchase a product associated with the advertisement(s). For example, at the DVR indexed advertisement area, a user selectable portion can be provided for the user to request further information or promotions. This may redirect the viewer/user to another online distributable media. The online distributable media can ask the user for additional information, such as an email, and provide an incentive to further pursue a product.

Again, and importantly, certain embodiments of the invention relate to a DVR recording. The ability to be interactively and continuously connected to the recording and provide an interactive and custom interface to the media is an important aspect of the invention. The user can be provided with a custom or preferable index to the media such as indexes to the media not previously provided. The user can also be provided with customized advertising. The advertising can be customized to the user's preferences, geographic location, gender, age, previous or current interests, etc. However the indexing and advertisements are accomplished using a DVR recording that may or may not be updated over time.

For example, a user might record a fighting ticket, which might include several matches. By indexing the recording, the user can skip to the headliner or other match of most interest instead of "fast forwarding" to the desired portion. As a consequence, the user might be required to view some advertisement. Nevertheless, the user was able to save time and view the desired content and the provider of the media or a third party was able to provide some advertisement value.

Figure 1:
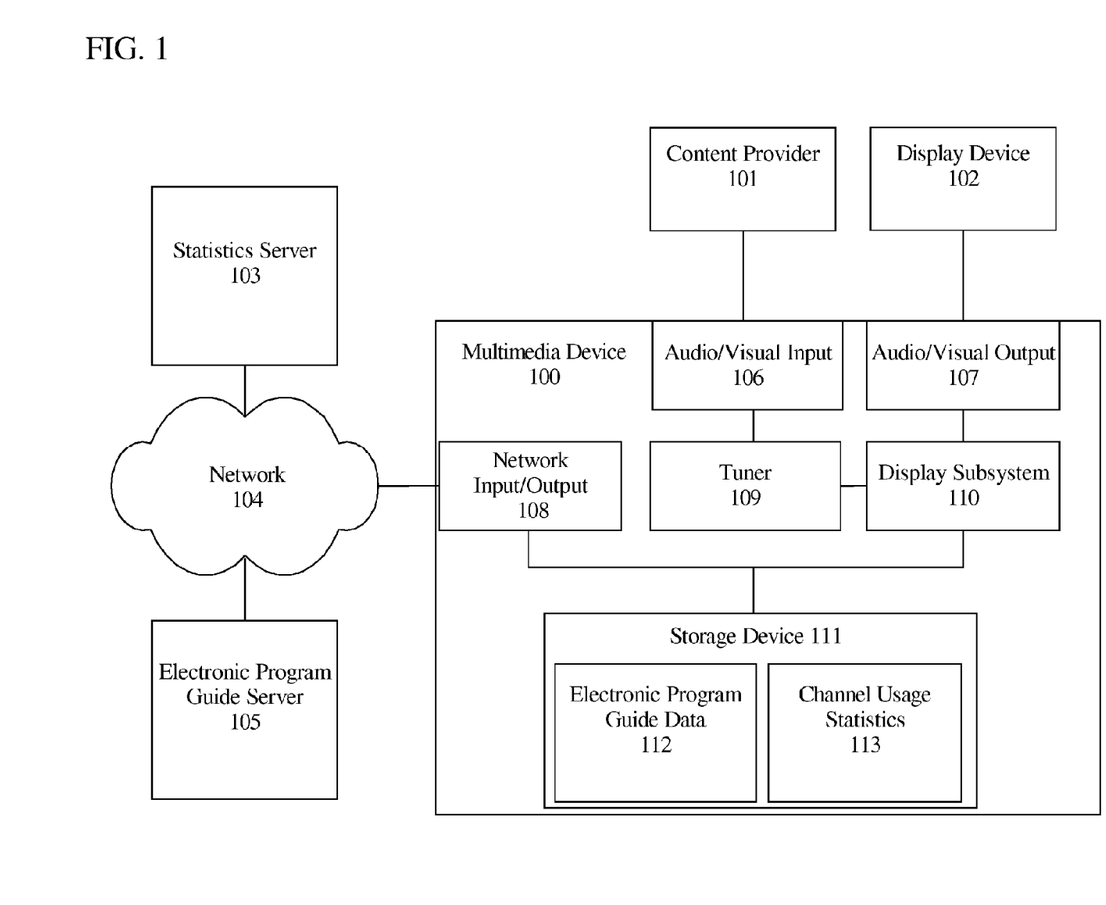
FIG. 1 illustrates an example environment upon which embodiments of the present invention may be implemented.

Referring to U.S. Publication 2014/0104495, the contents of which are hereby incorporated by reference in their entirety as showing components of a conventional DVR of which may be capable of being configured to practice some of the features of this invention disclosed and claimed herein. FIG. 1 illustrates an example environment upon which one or more embodiments of the present invention may be implemented, for example. Thus, it is admitted that DVRs, televisions, movies, recorded events and programs, and servers connected to the internet are not unknown devices as discussed hereinafter, however, not as claimed and discussed previously.

FIG. 1 shows a multimedia device 100, a content provider 101, a display device 102, a statistics server 103, a network 104, and an EPG server 105. The multimedia device 100 includes any of: an audio/visual input 106, an audio/visual output 107, a network input/output 108, a tuner 109, a display subsystem 110, and a storage device 111. The storage device 111 stores EPG data 112 and channel usage statistics 113. The EPG data 112 may be stored in storage device 111 in any form, e.g., database, linked list, flat file, or any type of data structure. Each of these components are presented to clarify the functionalities described herein and may not be necessary to implement the invention. Furthermore, components not shown in FIG. 1 may also be used to perform the functionalities described herein.

Multimedia device 100 represents any device capable of processing or presenting multimedia content. For example, multimedia device 100 may represent a set top box, such as a DVR, thin client, etc.

In an embodiment, audio/visual input 106 is any component that allows receipt of content from content provider 101. For example, audio/visual input 106 may represent a cable receiver, a radio receiver, or a satellite dish.

In an embodiment, content provider 101 represents any source from which multimedia device 100 may derive content. For example, content provider 101 may represent a local broadcaster that streams media content to multimedia device 100 over one or more channels or over the Internet. In one embodiment, content provider 101 transmits content over one or more analog frequencies. However, in another embodiment, content provider 101 transmits content in the form of a digital stream, using encodings such as MPEG-2, MPEG-4, etc.

In an embodiment, tuner 109 is any hardware or software component that allows multimedia device 100 to select content streamed by content provider 101 over a particular channel. In one embodiment, tuner 109 changes to a particular channel by tuning to an analog frequency associated with the particular channel. In another embodiment, tuner 109 changes to a particular channel by demultiplexing a digital stream provided by content provider 101. For example, the digital stream may be multiplexed using techniques such as statistical multiplexing, code division multiplexing, time division multiplex, or any other multiplexing techniques. Thus, depending on the embodiment, tuner 109 may rely upon tags, codes, time markers, or other features of the digital stream to select content associated with a particular channel. In an embodiment, after tuner 109 selects content from a particular channel, the tuner 109 provides the content to display subsystem 110.

In an embodiment, display subsystem 110 represents any combination of one or more hardware or software components that processes and transfers content to display device 102, through audio/visual output 107. In some embodiments, display subsystem 110 is capable of modifying the content provided by tuner 109 before transferring the content to display device 102. For example, display subsystem 110 may insert notifications, logos, advertisements, menu overlays, and other graphical elements into the content provided by tuner 109. In other embodiments, the graphical elements may be displayed instead of the content provided from tuner 109. For example, during a pause for a commercial break or to display a menu that covers the entire display of display device 102, as opposed to being overlaid over the content. In still other embodiments, the content from tuner 109 may be minimized to cover only part of the display of display device 102 with graphical elements inserted into the resulting free space. In an embodiment, the graphical elements used by display subsystem 110 are stored on storage device 111. However, in other embodiments, display subsystem 110 generates the graphical elements from data stored on storage device 111. In an embodiment, display subsystem 110 is the component of multimedia device 100 responsible for providing a view of the EPG data 112 to display device 102 for presentation to a user. In an embodiment, display subsystem 110 sorts through the EPG data 110 and constructs a user interface (UI) which is then provided to display device 102.

In an embodiment, audio/visual output 107 is any component that allows transfer of audio/visual data to display device 102. For example, audio/visual output 107 may represent an RCA connector, DVI, FireWire, Fiber-Optic, HDMI, DisplayPort, etc.

In an embodiment, storage device 111 is any device capable of storing data. For example, storage device 111 may represent a hard drive disk, solid state drive (SSD), random access memory (RAM), a flash drive, other storage devices, and combinations thereof.

In an embodiment, display device 102 is any device capable of displaying multimedia content. For example, display device 102 may be a television set, monitor, etc.

In an embodiment, network 104 represents any combination of one or more local networks, wide area networks, internetworks, service provider networks, etc. Data exchanged over network 104, may be transferred using any number of network layer protocols, such as Internet Protocol (TCP/IP), Multiprotocol Label Switching (MPLS), Asynchronous Transfer Mode (ATM), Frame Relay, etc. Furthermore, in embodiments where network 104 represents a combination of multiple networks, different network layer protocols may be used at each of the underlying networks. In some embodiments, network 104 represents the Internet.

In an embodiment, multimedia device 100 connects to network 104 through network input/output 108. For example, network input/output 108 may include a direct Ethernet connection, a Universal Serial Bus (USB) port for a wired or wireless Ethernet adapter, etc.

In an embodiment, EPG server 105 represents any server capable of providing EPG information to multimedia device 100. In an embodiment, EPG server 105 periodically sends updates to multimedia device 100 for incorporation into EPG data 112. For example, EPG server 105 may, at end of each week, send multimedia device 100 scheduling information related to the programs that will be aired during the next week or, optionally, send multimedia device 100 a notification that an EPG update is available. In an embodiment, incorporation includes updating EPG data 112 with new information or replacing EPG data 112 with new data received from EPG server 105. In other embodiments, rather than EPG server 105 initiating periodic updates, multimedia device 100 periodically requests updates from the EPG server 105.

In some embodiments, multimedia device 100, when receiving an update or independently of the reception of an update from EPG server 105, retrieves advertisements or instructions to play advertisements in association with particular channels or programs. These advertisements, in some embodiments, may be placed by display subsystem 110 into menus associated with those channels or programs. In other embodiments, the advertisements may be added to the content provided by tuner 109 when multimedia device 100 presents the associated channel or program.

In an embodiment, EPG data 112 contains metadata representing channel information. For example, the metadata for each channel may include a channel number, a channel name, a call sign, and a timeline of when programs air on the channel. Furthermore, EPG data 112 may contain metadata specific to particular programs, such as program title, content rating, actors, synopsis, producer, director, episode number (for programs that are episodic), reviews, etc.

In an embodiment, statistics server 103 is any server storing statistics related to channel usage. For example, statistics server 103 may store the frequency with which particular channels are accessed within various geographical areas or demographics. In order to compile these statistics, statistics server 103 may periodically poll for, or receive from, multimedia device 100, or other multimedia devices not depicted in FIG. 1, statistics related to how often particular channels are accessed by the users of each respective multimedia device. Thus, in an embodiment, when a user selects a channel, multimedia device 100 indicates the selection within channel usage statistics 113. Examples of information that may be stored within channel usage statistics 113 include channel number, channel name, call sign, the program playing at the time of selection, user profile data, the length of time the channel or program was viewed, timestamp, etc. In some embodiments, the information contained within channel usage statistics 113 may be anonymized before or after being transferred to statistics server 103 in order to protect user privacy. In an alternative embodiment, rather than statistics server 103 performing polling, each respective multimedia device may periodically report out collected statistics to statistics server 103.

In an embodiment, once statistics server 103 receives channel usage data from one or more multimedia devices, statistics server 103 analyzes the data for trends such as popular channels within geographical areas, demographics, or other any other type of grouping criteria. Statistics server 103 can then make the statistics related to the aforementioned trends available to multimedia device 100. Thus, multimedia device 100 may retrieve the trend statistics from statistics server 103 and store them within channel usage statistics 113 along with any independently collected statistics. For example, the statistics retrieved from statistics server 103 may relate to general groups of users whereas the statistics collected locally may relate to the specific users of multimedia device 100. In one embodiment, multimedia device 100 employs channel usage statistics 113 to determine which graphical elements (e.g. advertisements, etc.) should be displayed to a user. Furthermore, as will be described in more detail in later sections, multimedia device 100 in some embodiments uses channel usage statistics 113 to determine the order to present channels in various menus related to channel tuning and the display of EPG data 112.

3.0 Displaying the Electronic Program Guide

In an embodiment, multimedia device 100 displays a user interface (UI) presenting at least a portion of the EPG data 112 in response to receiving user input. For example, the user may utilize a remote that has a "guide" button that can be used to instruct the multimedia device 100 to display the EPG data 112 UI. As another example, the multimedia device 100 may present a menu with an option for displaying the EPG data 112 UI. In other embodiments, the multimedia device 100 displays the EPG data 112 UI automatically. For example, multimedia device 100 may display the EPG data 112 UI in response to the multimedia device 100 or the display device 102 being activated by a user. As a result, when a user begins a session of watching programs using multimedia device 100, the user is initially presented with EPG data 112 UI.

In some cases, EPG data 112 may contain information for a large number of channels, potentially hundreds or even thousands of channels. As a result, display device 102 may not be able to display all the information contained within EPG data 112 simultaneously without significantly impacting the readability of the information. Thus, according to an embodiment, the information contained within EPG data 112 is displayed in pages, each of which contains information for a subset of the channels represented within EPG data 112. In addition, pages may further save space on the display of display device 102 by including only a subset of the information available for each channel.

Figure 2:
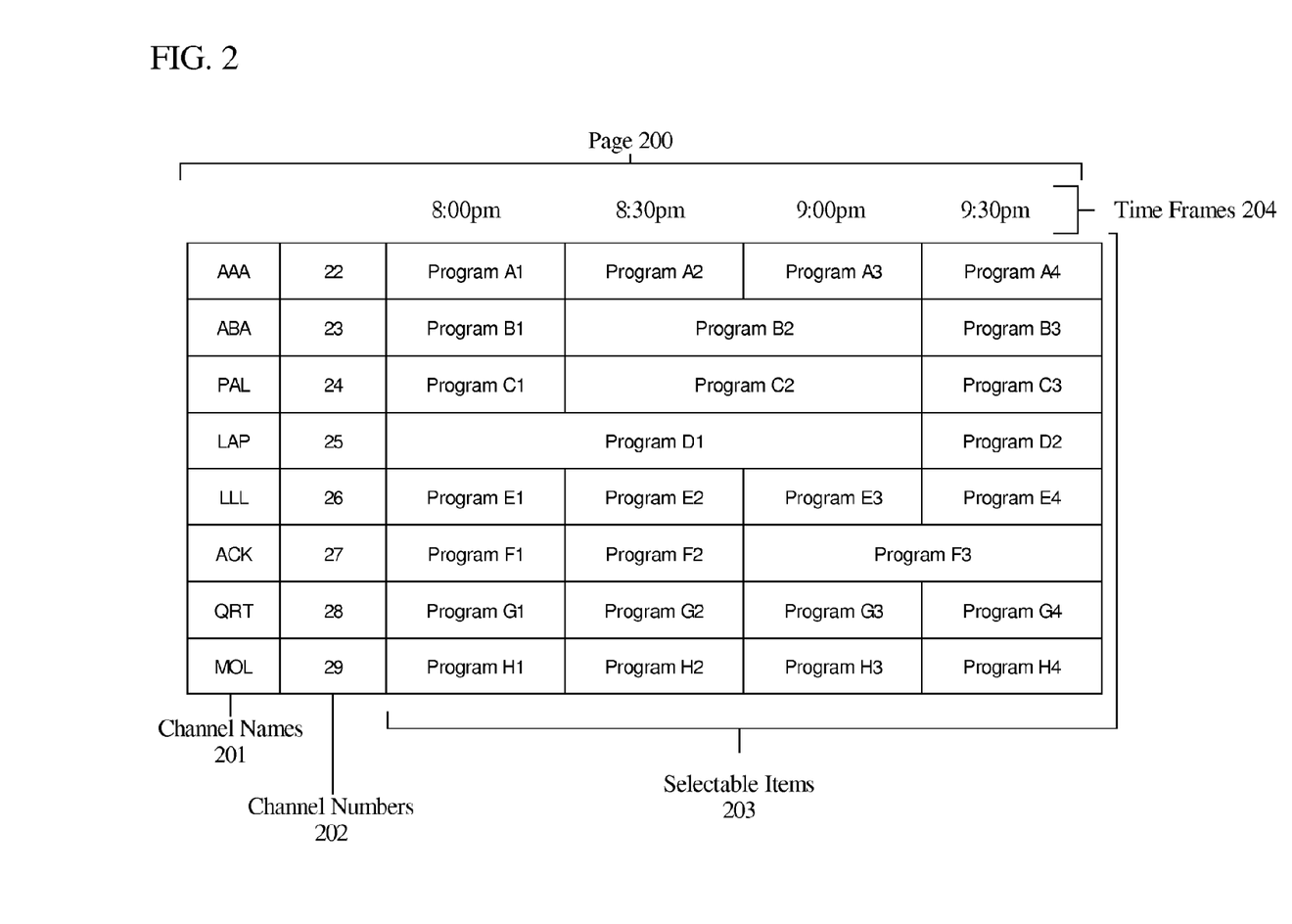
FIG. 2 illustrates an example page of a user interface (UI) screen for an electronic program guide (EPG) data according to an embodiment.

FIG. 2 illustrates an example page 200 of a UI for EPG data 112 according to an embodiment.

Page 200 is depicted within FIG. 2 in tabular format, with the rows representing each channel and the columns representing one or more informational elements for each channel. However, in other embodiments, page 200 may be displayed in formats other than a table.

The informational elements contained by page 200 include channel names 201, channel numbers 202, and one or more selectable items 203 representing the programs A1-H4 that have aired, are airing, or will be aired on each channel during time frames 204. Although each of the time frames 204, depicted in FIG. 2 represent a half hour interval, in other embodiments the time frames 204 may represent any other arbitrary interval or any combination of arbitrary intervals. For example, program A1 is depicted as airing on channel AAA at 8:00 PM. In other embodiments, the order and content of the informational elements may differ from the depiction of page 200.

In an embodiment, selectable items 203 display information for each of programs A1-H4 including program name, genre, content rating, and/or a short description of the program. Furthermore, users may select one of the selectable items to display additional information from EPG data 112 related to the corresponding program. For example, the additional information may include a more complete description of the program, the director of the program, the main actors of the program, a synopsis of the episode (should the program be episodic), production date, reviews of the program, etc. Furthermore, in the case where multimedia device 100 is a DVR or otherwise has the ability to record programs, the user may be presented with an option to schedule the program for recording. In other embodiments, the information displayed by each selectable item and/or displayed in response to selecting a selectable item may differ from the aforementioned examples.

In an embodiment, users are able to select a selectable item using a "pointer" oriented input device, such as a mouse or motion sensing controller Thus, the user orients the pointer over the desired selectable item and "clicks" to select the selectable item. In other embodiments, users select a selectable item using an input device with directional buttons, such as a remote control. Thus, multimedia device 100 navigates the user to an initial selectable item, which may be highlighted or otherwise visually distinguished from the other selectable items displayed on page 200. Then, utilizing the directional buttons, the user can navigate to adjacent selectable items, with the multimedia device 100 maintaining the highlighting over the selectable item to which the user is currently navigated. Once the user has navigated to a desired selectable item, the user can indicate selection by, for example, pressing a "select" button on the input device.

In an embodiment, multimedia device 100 allows the user to "scroll" through the channels represented within the EPG data 112. In one embodiment, the EPG data 112 may list the channels in a particular order, such as ascending or descending order by channel number. Initially, page 200 displays information for a particular number of channels corresponding to a segment of the list. The segment may be the top of the list, the bottom of the list, or an intermediate portion of the list. When the user attempts to navigate beyond the top-most or bottom-most boundary of page 200, multimedia device 100 shifts the segment further up or further down the list respectively (with or without wrap-around) to change the channels that are being displayed. For example, page 200 is depicted as containing information for channels 22-29. Should the user attempt to navigate upwards from the row representing channel "22", page 200 may be updated to display information for channels 21-28. Similarly, should the user attempt to navigate downwards from the row representing channel "29", page 200 may be updated to display information for channels 23-30. In other embodiments, multimedia device 100 may allow the user to "page up" or "page down", shifting the segment further up or down the list by more than one channel. In an embodiment, the number of channels shifted is based on the number of channels displayed on page 200. For example, in response to receiving user input to "page up" from page 200, page 200 may be updated to display information for channels 14-21.

In an embodiment, multimedia device 100 allows the user to "scroll" through the informational items available for each channel. In one embodiment, when the user attempts to navigate further to the right than the right-most boundary of the selectable items 203 on page 200, multimedia device 100 updates page 200 to advance the time frames that are currently being displayed. For example, should the user attempt to navigate further right from the column representing 9:30 pm, page 200 may be updated to display the programs playing from 8:30-10:30 PM. Similarly, when the user attempts to navigate further to the left than the left-most boundary of the selectable items on 203 on page 200, multimedia device 100 updates page 200 to display programs playing during a previous time frame. For example, should the user attempt to navigate further left from the column representing 8:00, page 200 may be updated to display the programs playing from 7:30-9:30 PM.

In some embodiments, multimedia device 100 tunes to a channel displayed on page 200. In one embodiment, multimedia device 100, in response to receiving user input instructing to tune to a channel, tunes to the channel associated with the row to which the user is currently navigated. For example, if a user is navigated to "Program F1" at the time user input is received, multimedia device 100 tunes to channel 58. In another embodiment, multimedia device 100 displays a menu option when one of the selectable items 403 is selected which gives the user the option to tune to the channel associated with that selectable item. In yet another embodiment, page 200 includes a selectable item that, when selected by the user, causes the multimedia device 100 to tune to the associated channel.

Figure 3:
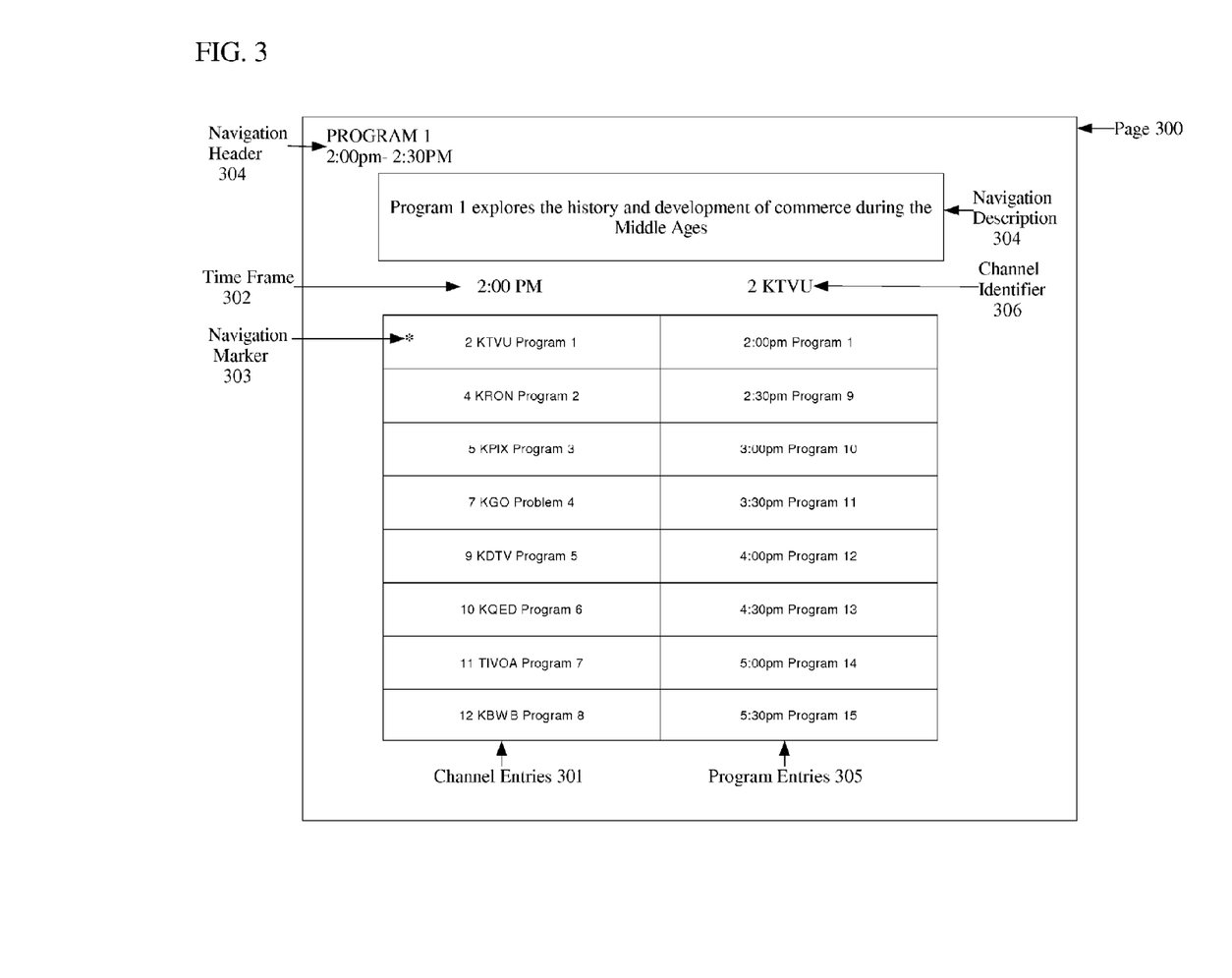
FIG. 3 illustrates an alternative example page of a UI screen for EPG data according to an embodiment.

FIG. 3 illustrates an alternative display for a page 300 of the EPG data 112 UI according to an embodiment. In FIG. 3, channel entries 301 represent a list of programs airing on a subset of the channels during timeframe 302. Each channel entry of channel entries 301 is associated with a particular channel, a particular program, and/or a particular time and displays information including any of channel number, channel name, call sign, program name, time frame, etc. Similar to page 200 of FIG. 2, the channel entries 301 can be scrolled by multimedia device 100 in response to receiving user input navigating through the channel entries 301. In addition, multimedia device 100 visually distinguishes the channel entry to which the user is currently navigated with navigation marker 303. In other embodiments, rather than using navigation marker 303, multimedia device 100 may visually distinguish the channel entry to which the user is currently navigated using other techniques, such as highlighting the channel entry, displaying the channel entry in a different font, adjusting the channel entry's size, etc.

Navigation header 304 displays information for the program associated with the channel entry to which the user is currently navigated. For example, navigation header 304 may display the program's name and the time frame during which the program airs. In addition, program description 304 contains a short description of the program. When the user is navigated to a particular channel entry, multimedia device 100 displays a list of program entries 305, representing programs airing on the associated channel during previous, current, and/or future time frames. In some embodiments, program entries 305 display the same types of information as channel entries 301. However, in other embodiments, program entries 305 display different types of information than channel entries 301. For example, in the embodiment of FIG. 3, each program entry displays a program name and a time during which the program airs whereas each channel entry displays a program name, channel name, and channel number. In the illustration of FIG. 3, the user is currently navigated to the channel entry associated with "Program 1" airing on channel "KTVU" at 2:00 pm. Thus, program entries 305 contain one or more entries representing the programs associated with channel "KTVU" that are viewable in whole or in part during the period 2:00 pm-5:30 pm. In an embodiment, multimedia device 100, in response to user input, scrolls through program entries 305 and displays additional program entries representing previous or subsequent timeframes beyond those currently displayed.

In an embodiment, multimedia device 100 determines whether the user is scrolling through channel entries 301 or program entries 305 based on operating mode. For example, multimedia device 100 may begin by default in an operating mode that assumes input indicating to scroll should be interpreted as scrolling through channel entries 301. However, should multimedia device 100 receive a particular type of input, multimedia device 100 changes to an operating mode that interprets future input indicating to scroll as scrolling through program entries 305. Similarly, in response to receiving another type of input, multimedia device 100 returns to the original operating mode. For example, assuming a directional input device, a user may scroll by submitting input indicating "up" or "down". Thus, initially, "up" and "down" are interpreted as scrolling through channel entries 301. In response to receiving input indicating "right" multimedia device 100 changes to an operational mode that interprets future "up" and "down" input as scrolling through program entries 305. Then, in response to receiving input indicating "left", multimedia device 100 returns to the original operating mode and interprets future "up" and "down" input as scrolling through channel entries 301. In other embodiments, the scrolling input and the input that causes multimedia device 100 to change modes may differ from the above example. Furthermore, in some embodiments, the same type of input may be used to switch between operational modes, as opposed to different inputs being used to switch back and forth as described in the example above.

In an embodiment, in response to user input selecting an entry from channel entries 301 or program entries 305, multimedia device 100 displays additional information related to the selected entry. For example, the additional information may include a more detailed description of the associated program, content ratings, actors, directors, producers, reviews, and/or options to view the associated program or schedule the associated program for recording.

In an embodiment, multimedia device 100 displays the EPG data 112 UI in accordance with the techniques described in U.S. Pat. No. 6,642,939, "Multimedia Schedule Presentation System", owned by the Applicants, the entire contents of which is incorporated by reference for all purposes as though fully stated herein.

Although the following descriptions and examples will be described primarily in reference to the page format illustrated in FIG. 2, the same techniques may be applied in other embodiments to different page formats, such as the page format illustrated in FIG. 3, the UI described in "Multimedia Schedule Presentation System", etc.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of indexing an audio and video program, the indexing being received by a digital video recording device (DVR) from a server, the program being at least partially previously digitally recorded on the DVR, the method comprising:

first, at least partially downloading the digital recording of the audio and video program, the program including a first segment of the program and a second segment of the program, the first and second segments of the program being defined between a beginning of the program and an end of the program;

second, downloading from the server a first index of the digital audio and video program to the DVR that is relative to the previously downloaded digital recording of the audio and video program, the first index being then associated with the digital recording of the audio and video program so as to enable a user to navigate the digital recording of the audio and video program using the subsequently downloaded first index of the digital audio and video program;

third, associating the first index to both the first and second segments of the digital audio and video program saved on the DVR thereby, fourth enabling the user of the DVR to digitally navigate the digital recording of the audio and video program according to the first index;

fifth, while the user navigates the first segment of the audio/video program according to the first index, downloading from the server a second index related to the second segment of the audio/video program, wherein the second segment of the audio/video program is updated by the second index while the first segment is being navigated by the user according to the first index; and sixth, after the user has navigated the first segment of the program, enabling the user to navigate the newly indexed second segment of the associated digital recording of the audio/video program using the subsequently downloaded second index of the digital audio and video program such that the DVR recorded program is interactively and continuously indexed by the server as it is displayed to the user.

2. The method of claim 1, wherein the first index is generated when the second segment of the audio and video program is not previously predictable.

3. The method of claim 1, wherein the audio and video program is a sports event and the indexing is directed to a sports defined division of the sports event including the beginning and/or end of a quarter, period, bout, fight, or half-time event of the sports event.

4. The method of claim 1, wherein the audio and video program is a sports event and the indexing is directed to a sports defined event of the sports event including a goal, win, final minutes, or score of the sports event.

5. The method of claim 1, wherein the audio and video program is a live reality show where the first segment within an episode of the reality show extends in length longer than the second segment within the episode of the reality show.

6. The method of claim 1, wherein the audio and video program is a live news program where the first segment of the news program extends in length longer than the second segment of the news program.

7. The method of claim 1, further comprising downloading an audio visual advertising segment to be inserted or supplemented while the user navigates from the first indexed segment to the second indexed segment of the audio video program.

8. The method of claim 7, wherein the audio visual advertising segment is subsequently determined and updated thereafter based on a previous event of the first segment of the originally recorded audio and video program and downloaded to the digital recorder.

9. The method of claim 7, wherein the audio visual advertising segment is inserted or supplemented in the second segment of the program while the user navigates the first indexed segment of the program.

10. The method of claim 7, wherein the audio visual advertisement is presented in a sub-window as the user navigates from the first indexed segment to the second indexed segment.

11. The method of claim 7, wherein the audio visual advertisement does not disturb the time-shifting aspect of forwarding from of the navigation from the first indexed segment to the second indexed segment, rather is time compressed.

12. The method of claim 7, wherein the audio visual advertisement associated with the second indexed segment is interactively and continuously updated based on a georeferenced location of the user by the second index.

13. The method of claim 1, wherein the audio and video program itself is audio and visually adjusted with a time indexed adjacent media that supplements audio and video media of the second segment of the program according to the second index downloaded to the DVR.

14. The method of claim 1, wherein the indexing of the audio and video program is manually modified by the user.

15. The method of claim 1, wherein the indexing of the audio and video program is viewable and manually approved by the user prior to its application.

16. The method of claim 1, wherein the second index replaces a portion of the second segment of the audio/video program while the user is navigating the first segment according to the first index.

17. The method of claim 16, wherein the portion of the second segment is replaced due to a copyright violation.

18. The method of claim 16, wherein the portion of the second segment is replaced due to a privacy violation.

19. The method of claim 1, further comprising downloading additional indices associated with additional sections or particular media of the audio/video program such that the server is interactively and continuously connected to the recorded program on the DVR.

* * * * *